United States Patent [19]

Wahlberg, deceased et al.

[11] Patent Number: 4,804,401

[45] Date of Patent: * Feb. 14, 1989

[54] METHOD OF PRODUCING A PHOSPHORUS FERTILIZER SOIL CONDITIONER

[76] Inventors: Arvo Wahlberg, deceased, late of Espoo; by Anna-Maija Wahlberg, legal representative, Miniatentie 4-C-16, 02360 Espoo, both of Finland

[*] Notice: The portion of the term of this patent subsequent to Dec. 1, 2004 has been disclaimed.

[21] Appl. No.: 921,503

[22] Filed: Oct. 17, 1986

Related U.S. Application Data

[63] Continuation-in-part of Ser. No. 853,354, Apr. 17, 1986, Pat. No. 4,710,219.

[51] Int. Cl.⁴ .................. C05F 13/00; C05B 17/00
[52] U.S. Cl. ........................... 71/11; 71/12; 71/23; 71/24; 71/31; 71/32; 71/33; 71/903
[58] Field of Search .............. 71/11, 12, 23, 24, 903, 71/31–33

[56] References Cited

U.S. PATENT DOCUMENTS

| | | | |
|---|---|---|---|
| 3,239,329 | 3/1966 | Burgon | 71/23 |
| 4,571,254 | 2/1986 | Wahlburg | 71/23 X |
| 4,710,210 | 12/1987 | Wahlberg | 71/11 |

Primary Examiner—Ferris H. Lander
Attorney, Agent, or Firm—Herbert Dubno

[57] ABSTRACT

A method for producing combined phosphorus fertilizer and soil conditioner in which phosphate rock and, as reaction matter, organic acidic matter are used. In a method according to the invention, the acidic mass is organic, for instance, bark waste, peat, waste fiber from a cellulose production plant or paper mill, sawdust or similar matter.

14 Claims, 1 Drawing Sheet

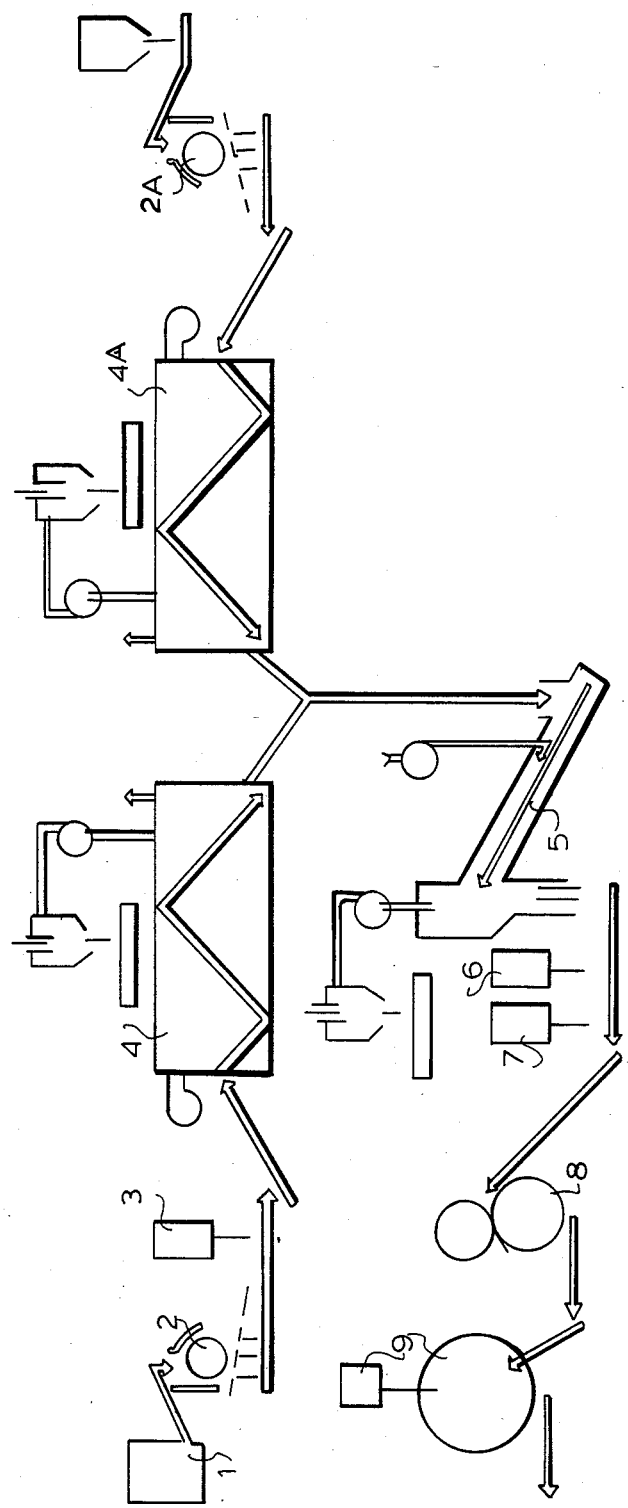

METHOD OF PRODUCING A PHOSPHORUS FERTILIZER SOIL CONDITIONER

CROSS REFERENCE TO RELATED APPLICATION

This application is a continuation in part of Ser. No. 853,354 filed Apr. 17, 1986 now U.S. Pat. No. 4,710,219, Dec. 1, 1987.

FIELD OF THE INVENTION

The present invention relates to the production of an improved soil conditioner with phosphorus fertilizing effects.

BACKGROUND OF THE INVENTION

The phosphorus in phosphate rock or in its concentrates, e.g. apatite and phosphorite, is insoluble or only sightly soluble in water and thus available for plants in limited quantities.

In producing phosphorus fertilizers the objective is to increase the solubility of phosphorus.

Normally the solubility of phosphorus contained in the fertilizer is defined as a proportion of the soluble phosphorus, soluble either in water, in ammonium citrate or in 2% citric acid, compared to the total phosphorus content.

The most common production of phosphorus fertilizers is to treat phosphate rock with an inorganic acid, producing a compound suitable for fertilizing purposes as such, or for further processing.

Another method for producing phosphorus fertilizers is the heat treatment of a mixture of phosphate rock and some other substances at a high temperature.

Phosphorus fertilizers are also obtained from iron ores containing phosphorus, as a by-product in the steel industry. The phosphorus fertilizers are produced by a reaction of phosphate rock with an inorganic acid.

When sulfuric acid is used for the reaction with phosphate rock, the reaction product is a mixture of monocalcium phosphate and calcium sulphate (gypsum), called superphosphate.

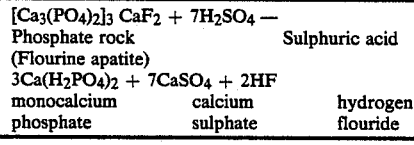

[Ca$_3$(PO$_4$)$_2$]$_3$ CaF$_2$ + 7H$_2$SO$_4$ —
Phosphate rock       Sulphuric acid
(Flourine apatite)
3Ca(H$_2$PO$_4$)$_2$ + 7CaSO$_4$ + 2HF
monocalcium    calcium      hydrogen
phosphate      sulphate     flouride The superphosphate contains approximately 8% phosphorus, of which at least 93% is soluble in water.

When the tricalcium phosphate in phosphate rock is allowed to react with sulphuric acid and water, the reaction products are phosphoric acid and calcium sulphate:

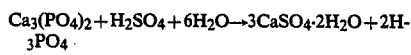

Ca$_3$(PO$_4$)$_2$+H$_2$SO$_4$+6H$_2$O→3CaSO$_4$·2H$_2$O+2H$_3$PO$_4$

Phosphoric acid is used in a further reaction to produce phosphorus fertilizers, such as triple superphosphate and ammonium phosphates.

In a reaction of phosphate rock with phosphoric acid, triple superphosphate, an almost pure monocalcium phosphate compound, is produced:

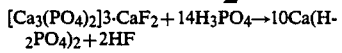

[Ca$_3$(PO$_4$)$_2$]$_3$·CaF$_2$+14H$_3$PO$_4$→10Ca(H$_2$PO$_4$)$_2$+2HF

The phosphorus content of the triple superphosphate is approximately 22%, of which at least 93% is soluble in water. The reaction product of phosphate rock and hydrochloric acid is dicalcium phosphate (CaHPO$_4$), which has little value as a fertilizer.

The reaction of phosphate rock with nitric acid produces a mixture of monocalcium phosphate and calcium nitrate.

After calcium nitrate has been removed, the mixture contains monocalcium and dicalcium phosphates. The N:P ratio in the fertilizer is generally in the range of 1:0.44 to 1:1.3, and its content of soluble phosphorus is 0 to 80%, depending on the production method.

Phosphorus fertilizers manufactured by heat processes include Rhenania phosphate, produced by heating a mixture of phosphate rock, sodium carbonate and arenaceous quartz at a temperature of 1200° C.

Ca$_{10}$(PO$_4$)$_6$F$_2$+3Na$_2$CO$_3$+2SiO$_2$+H$_2$O

6CaNaPO$_4$+2CaSiO$_4$+3CO$_2$+2HF

Rhenania phosphate

Rhenania phosphate has a phosphorus content of 11% and is soluble in basic ammonium citrate.

Iron ore containing phosphorus yields Thomas slag as a by-product in the steel industry. Limestone and oxygen are added to the molten iron ore, thus separating the slag on the surface of the mixture.

Thomas slag contains approximately 7 to 10%, of which 90% is soluble in a 2% solution of citric acid.

The process of treating phosphate rock with sulphuric acid is very complex and requires a high pressure, great accuracy and a great deal of energy. Another reaction product is toxic hydrogen flouride.

Sulphuric acid is not only toxic but also expensive, due to the complexity of its production process and the high input of energy require. Although superphosphate contains calcium sulphate, an excessive amount of calcium sulphate waste is also produced in the process, thus causing an environmental hazard.

When treating phosphate rock with sulphuric acid and water in order to produce phosphoric acid, the hazards are the same as mentioned above, with the exception that even more calcium sulphate waste is produced. In addition, the valuable micro nutrients and lanthanides are lost in the process.

Phosphoric acid can be regarded as a mere intermediate product, because its use as a fertilizer is very inconvenient.

Consequently, it is further processed into other fertilizers, such as triple superphosphate, as described above, or fertilizing compounds.

The reactions of phosphate rock with hydrochloric or nitric acid are utilized very infrequently.

During heat treatment of phosphate rock, the substances contained in the rock are retained in the fertilizer. However, the required temperature of 1200° C. is extremely high, involving very high energy consumption. In addition, the phosphorus in the end product is not water-soluble.

Thomas slag is one of the oldest phosphorus fertilizers. It is, however, produced only by the steel industry, and only if the iron ore contains phosphorus. Another disadvantage of the process is that it causes considerable noxious odors.

SUMMARY OF THE INVENTION

The invention eliminates or considerably reduces the previously mentioned hazards or drawbacks as follows:

Consumption of energy remains remarkably low

No industrially produced inorganic acids are needed

There are no environmental hazards in the process, such as toxic reaction products, odor or waste products.

The nutrient elements of phosphate rock are almost completely retained in the fertilizer.

According to the invention the method comprises:

(a) comminuting phosphate rock to a particle size at least predominantly of 0.02 to 3 mm;

(b) inducing collision between the comminuted phosphate rock at a temperature of substantially 50° C. to 800° C. and an acidic moist organic reaction mass with a moisture content of at least 40% and a pH of less than 6 at a temperature of substantially 40° C. to 200° C., and mixing said mass with said comminuted rock to effect a reaction therebetween; and (c) recovering from step (b) a combined phosphorus fertilizer and soil conditioner whose soluble phosphorus content has been increased by the reaction over the soluble phosphorus content of the phosphate rock used in step (a).

Preferably said particle fraction is substantially 0.02 to 1 mm, said temperature of said organic mass is 40° C. to 120° C., the pH of said organic mass is less than 5.5, and said comminuted rock is heated to a temperature of 400° C. to 500° C. before being mixed with said organic mass.

BRIEF DESCRIPTION OF THE DRAWING

The sole Figure of the drawing is a flow diagram of the method.

SPECIFIC DESCRIPTION

The organic material, consisting of uncomposted bark waste or peat, is fed from a feed silo 1, to a grinding unit, 2. If waste fiber from a cellulose production plant of a pulp or paper mill or saw dust is used in addition to or instead of the materials mentioned above, the organic material can be fed to the process directly from the tank 3.

Waste fiber is understood as precipitated slurry from a water treatment station of a cellulose production plant of a pulp or paper mill and thus contains mainly short wood fibers not suitable for pulp or paper production. This slurry always contains very fine particles of bark.

All the materials mentioned must be acidic, with a pH of less than 6, preferably lower than 5.5. The reaction mass of bark, peat, cellulose waste material or sawdust is heated in the reactor furnace 4, to a temperature of 40° to 120° C., depending on the water content of the mass; the greater the water content, the higher the temperature, and the higher the temperature of the phosphate rock, the lower the temperature of the mass.

This process corresponds to the process described in the Finnish Patent document FI841230. "A METHOD FOR PRODUCING FERTILIZERS FROM WOOD ASHES AND SOFTWOOD BARK OR FROM OTHER WOOD WASTE MATERIAL", with the exception that the water content of the fresh organic material should be 40% at the minimum. This requirement is not included in the production method described in Finnish Patent document No. FI841230.

After the reactor furnace 4, phosphate rock, either magmatic, metamorphic or sedimented in origin or a concentrate of these rocks, is fed into the process. The rock should be preprocessed in the following way: first, the rock is ground in a grinder 2A, to a particle size of 0.02 to 3 mm. The smaller the particle size, the higher the content of phosphorus, soluble in water and/or in citric acid, in the fertilizer. The optimum size is 0.02 to 1 mm.

After grinding, the rock is transferred to a rotating heating furnace 4A, in which the surface temperature is approximately 800° C. The particles are rapidly heated to a temperature of 50° C. to 800° C., with an optimum temperature of 400° to 500° C. The optimum temperature depends on the quality of the phosphate rock and on its water content. The closer to the temperature the reaction taken place, the higher the content is soluble, in water and/or in citric acid, phosphorus in the end product.

If in its natural state the solubility of the phosphorous in the phosphate rock in citric acid is at least 10% (concentration of the citric acid 2%), heating is unnecessary and the phosphate rock at a temperature of about 20° C. is mixed with the heated acidic organic mass. After this stage, the mass of phosphate rock and organic reaction mass from the reactor furnace 4, are allowed to collide and mix.

Generally, the higher the pressure under which the phosphate rock was formed, the higher the temperatures must be, thus also leading to higher pressures at the mixing stage. This results in partial or complete disintegration of the phosphate rock or its concentrate, due to the following factors:

1. Because the pH of the organic reaction mass is lower than that of the rock, the acidity of the mixture will tend towards a state of equilibrium. The lower pH of the organic matter is, the stronger the chemical reaction between the organic matter and the phosphate rock will be, and the higher the content of phosphorus soluble in water and/or in citric acid in the fertilizer will also be.

2. Because the calcium and phosphorus contents are lower in the organic matter than in the phosphate rock, the lower the calcium and phosphorus content of the organic mass is, the stronger the chemical reaction between them is, and also the higher the content of phosphorus soluble in water and/or phosphorus soluble in citric acid in the fertilizer.

The weight ratio of dry phosphate rock and fresh organic matter is 0.015 to 0.65. The greater the amount of organic matter, the greater amount of the phosphorus in the rock or in its concentrate is converted into phosphorus soluble in water and/or in citric acid. The time required for the reaction is 10 to 60 minutes, generally approximately 15 minutes. The longer the reaction time, the greater the amount of phosphorus in the rock or in its concentrate is converted into water-and/or citric acid-soluble form.

In addition to the organic waste materials mentioned above-fresh bark waste, peat, waste fiber from cellulose production plant or paper mill, or sawdust - other equivalent organic matters can also be used as reagents.

After the reaction, the mass, the temperature of which is 90° C., is cooled quickly in a cooler 5, to a temperature of 20° C. to 40° C.

Finally, wood or bark ashes can be added, if necessary, from the tank 6, or nitrogen from tank 7, and the mass is granulated on the rollers 8, if desired, and the ashes can be applied to the surface of the granules in the mixing tank 9, as in the process described in Finnish Patent document no. FI841230.

The content of phosphorus soluble in water and/or in citric acid can be up to 95%, depending on the amount and characteristics of the organic matter and of the phosphate rock as well as the reaction time. The reaction product is monocalcium phosphate ($Ca(H_2PO_4)_2$), a phosphorus compound soluble in water or phosphate of similar composition.

The energy consumption remains low, because the reaction occurs at a low temperature and because the organic reaction matter is not produced industrially. There is no environmental hazards; on the contrary, the process consumes organic matter that is hazardous to the environment. The nutrient fractions contained in the phosphate rock are retained more completely than in processes involving the use of inorganic acids, as completely as in heat treatment methods.

The combined phosphorus fertilizer and soil conditioner can also be used as covering material, if desired. In this case, the solubility of the phosphorus is of no practical consequence. Thus the content of phosphorus soluble in water and/or in citric acid can be low and the production process can be somewhat simplified: the reaction time can be short, and the temperature to which the phosphate rock is heated, can be low; heating can be omitted if the solubility of the phosphate in the citric acid of the phosphate rock amounts to at least 10%.

I claim:

1. A process for producing a combined phosphate fertilizer and soil conditioner without employing a mineral acid, which consists essentially of the steps of:
   (a) providing a comminuted, moist, acidic waste material having a pH less than 6, a water content of at least 40%, and lower calcium and phosphorous contents than the calcium and phosphorous contents of phosphate rock;
   (b) heating the comminuted, moist, acidic, organic waste material provided in step (a) to a temperature of 40° C. to 120° C.;
   (c) comminuting phosphate rock to a particle size of 0.02 to 3 mm;
   (d) heating the phosphate rock comminuted in step (c) to a temperature of 50° C. to 800° C.;
   (e) inducing collision between the comminuted phosphate rock heated during step (d) and the comminuted, moist, acidic, organic waste material heated during step (b) at a temperature of substantially 40° C. to 120° C., and mixing said organic waste material with said phosphate rock to effect a reaction therebetween; and
   (f) removing from step (e) a combined phosphate fertilizer and soil conditioner whose soluble phosphate content in water or citric acid has been increased by the reaction over the soluble phosphate content of the phosphate rock used in step (c).

2. The method defined in claim 1 wherein said particle fraction is substantially 0.02 to 1 mm, the pH of said organic mass is less than 5.5, and said comminuted rock is heated to a temperature of 400° C. to 500° C. before being mixed with said organic mass.

3. The method defined in claim 1 wherein said organic mass is waste bark.

4. The method defined in claim 1 wherein said organic mass is peat.

5. The method defined in claim 1 wherein said organic mass is waste fiber from a cellulose production plant of a pulp or a paper mill.

6. The method defined in claim 1 wherein said organic mass is sawdust.

7. The method defined in claim 1 wherein the amount of phosphorus soluble in water or in citric acid in the fertilizer is regulated by the pH of the reagent mass.

8. The method defined in claim 1 wherein the amount of phosphorus soluble in water or citric acid in the fertilizer is regulated by the calcium and phosphorus content of the reagent mass.

9. The method defined in claim 1 wherein the amount of phosphorus soluble in water or citric acid in the fertilizer is regulated by the reaction temperature.

10. The method defined in claim 1 wherein the amount of phosphorus soluble in water or citric acid in the fertilizer is regulated by the retention time of the reaction.

11. The method defined in claim 1 wherein the amount of phosphorus soluble in water or citric acid in the fertilizer is regulated by the weight ratio of the fresh organic mass and the dry phosphate rock.

12. The method defined in claim 1 wherein the amount of phosphorus soluble in water or citric acid in the fertilizer is regulated by the particle size of the comminuted phosphate rock.

13. The method defined in claim 1 wherein the solubility of the phosphorus in water and or citric acid is low to enable the product to be used as a ground-covering material.

14. A process for producing a combined phosphate fertilizer and soil conditioner without employing a mineral acid, which consists essentially of the following steps:
   (a) providing a comminuted, moist, acidic, organic waste material having a pH less than 6, a water content of at least 40% and lower calcium and phosphorous contents than the calcium and phosphorous contents of phosphate rock;
   (b) heating the comminuted, moist, acidic, organic waste material produced in step (a) to a temperature of 40° C. to 120° C.;
   (c) comminuting phosphate rock to a particle size of 0.02 to 3 mm;
   (d) mixing the comminuted phosphate rock which in its natural state has a solubility in citric acid of at least 10% with the heated, comminuted, moist, acidic, organic waste material at 20° C. to effect a reaction therebetween; and
   (e) recovering from step (d) a combined phosphate fertilizer and soil conditioner whose soluble phosphate content in water or citric acid has been increased by the reaction over the soluble phosphate content of the phosphate rock used in step (c).

* * * * *